(No Model.)
L. T. LENDERKING.
DAMPER FOR PIPES.
No. 518,785. Patented Apr. 24, 1894.
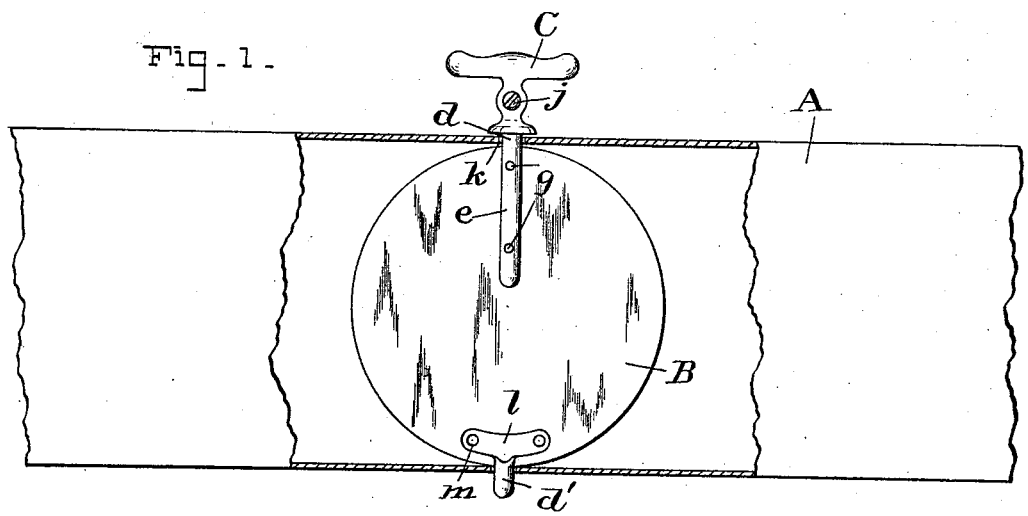
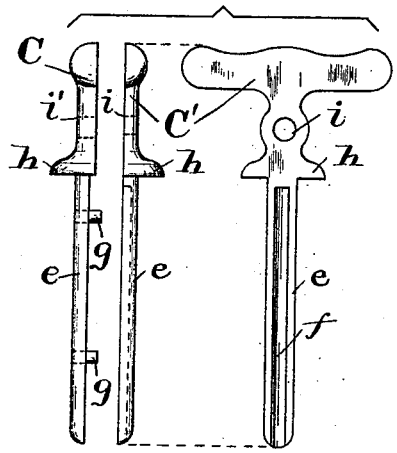
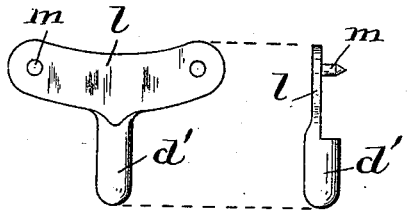
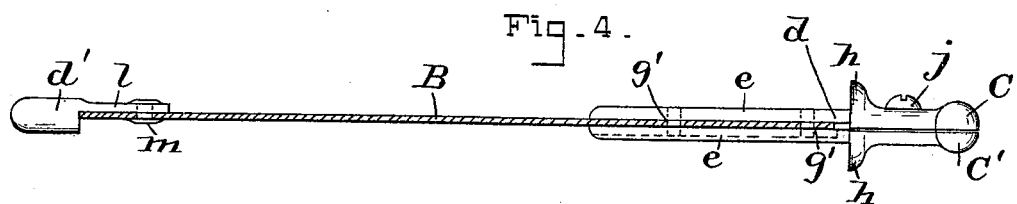
WITNESSES:
L. I. Van Horn.
Charles B. Mann Jr.
INVENTOR:
L. T. Lenderking
By Chas. B. Mann

UNITED STATES PATENT OFFICE.

LOUIS T. LENDERKING, OF BALTIMORE, MARYLAND.

DAMPER FOR PIPES.

SPECIFICATION forming part of Letters Patent No. 518,785, dated April 24, 1894.

Application filed January 27, 1894. Serial No. 498,178. (No model.)

*To all whom it may concern:*

Be it known that I, LOUIS T. LENDERKING, a citizen of the United States, residing at Baltimore, in the State of Maryland, have invented certain new and useful Improvements in Dampers for Pipes, of which the following is a specification.

This invention relates to an improved damper for smoke or hot-air pipes.
The object of the invention is to provide improved means for conveniently mounting a damper within a pipe.

The accompanying drawings illustrate the invention.
Figure 1 is a view of a pipe, and a damper provided with the improved journals and handle. Fig. 2 shows the two parts separately comprising the handle and one journal. Fig. 3 shows two views of the other journal. Fig. 4 is a section view showing the handle and journals attached to the damper.

It is often necessary for a workman to go to a place where the pipes are already up, for the purpose of fitting a damper in the said pipes. In such cases when the workman goes to perform the job, he is generally without knowledge as to the size of the pipes, and cannot carry a ready-made damper along. Under such circumstances and with the facilities hitherto in use the fitting of a new damper to a pipe already set up in position becomes a troublesome matter. By means of the improved handle and journals for dampers herein shown and described, a disk or circular plate of any size may first be cut from sheet-metal to fit a certain pipe, and then the improved handle and journals readily attached to said disk to complete the damper; thus the mounting of a damper, when my improvements are used, is a simple and easy matter.

The letter, A, designates the pipe; B, the circular plate or disk of the damper of size to fit and turn within the pipe; the handle and one journal, d, are combined and consist of two pieces or halves, C, C', each of which has a long shank, e, to take on opposite sides of the disk, B; one shank has a longitudinal groove, f, and the other has two pins or lugs, g, the projecting ends of which take into the longitudinal groove, f, when the two pieces are in position on the disk, B. Each pin has a shoulder, h, and the journal, d, is the small part between the shoulder and disk; one piece has a screw socket, i, in the handle and the other piece has a hole, i', correspondingly located so that a screw, j, may be passed first through the hole, i', and then take into the screw socket, i, and thus the screw will bind the two parts of the handle and the two shanks tightly together. The disk or plate, B, has two holes, g', to receive the pins or lugs, g, which are on one of the shanks; these pins or lugs pass through the holes and the ends of the pins project into the groove, f, of the other shank, as already stated; thus the combined handle and journal is secured to the disk. It will be seen that to apply the handle to the disk, when mounting the latter in the pipe, first insert the disk, then insert one piece of the shank, e, endwise through the hole, k, so as to take on one side of the disk, and then insert the other shank piece, e, so as to take on the opposite side of the disk, then adjust the two shanks so that the pins or lugs, g, will pass through the holes, g', in the disk and into the groove, f, and finally insert the screw, j. The other journal, d', has a flange or wings, l, provided with spuds or lugs, m, which are driven through the disk and riveted previous to the insertion of the disk in the pipe.

Having thus described my invention, what I claim is—

1. The combination of a damper plate, and a handle and journal combined consisting of two pieces or halves, C, C', each having a shank—said shanks taking on opposite sides of the plate—one shank being provided with a groove and the other with pins, g, which pass through the damper plate, and a screw, j, securing the said two pieces or halves together.

2. The combination of a damper plate, a handle and journal combined consisting of two pieces or halves, C, C', each having a shank—said shanks taking on opposite sides of the plate—one shank being provided with a groove and the other with pins, g, which pass through the damper plate, a screw, j, securing the said two pieces or halves together, and a journal, d', diametrically opposite the handle, having a flange, l, secured to the disk, as set forth.

In testimony whereof I affix my signature in the presence of two witnesses.

LOUIS T. LENDERKING.

Witnesses:
THOS. C. BAILEY,
CHAS. B. MANN, Jr.